(12) United States Patent
Ksyta et al.

(10) Patent No.: US 11,816,721 B2
(45) Date of Patent: Nov. 14, 2023

(54) RECOMMENDATION APPARATUS AND METHOD

(71) Applicant: OCADO INNOVATION LIMITED, Hatfield (GB)

(72) Inventors: Martyna Ksyta, Hatfield (GB); Jakub Smajek, Hatfield (GB); Michal Żelechowski, Hatfield (GB); Jose Jimenez, Hatfield (GB); Przemyslaw Pastuszka, Hatfield (GB); Maciej Mnich, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 31 days.

(21) Appl. No.: 16/964,563

(22) PCT Filed: Jan. 24, 2019

(86) PCT No.: PCT/EP2019/051704
§ 371 (c)(1),
(2) Date: Jul. 23, 2020

(87) PCT Pub. No.: WO2019/145395
PCT Pub. Date: Aug. 1, 2019

(65) Prior Publication Data
US 2021/0035188 A1 Feb. 4, 2021

(30) Foreign Application Priority Data

Jan. 25, 2018 (GB) .................................... 1801228
Mar. 2, 2018 (GB) .................................... 1803405

(51) Int. Cl.
*G06Q 30/00* (2023.01)
*G06Q 30/0601* (2023.01)
(Continued)

(52) U.S. Cl.
CPC ......... *G06Q 30/0631* (2013.01); *G06F 17/18* (2013.01); *G06N 20/00* (2019.01)

(58) Field of Classification Search
CPC ... G06Q 30/06–08; G06N 20/00; G06F 17/18
(Continued)

(56) References Cited

U.S. PATENT DOCUMENTS 9,727,906 B1 8/2017 Sarmento et al.
10,430,808 B2 10/2019 Sato et al.
(Continued)

FOREIGN PATENT DOCUMENTS

JP 2008287550 A 11/2008
JP 2016206734 A 12/2016
(Continued)

OTHER PUBLICATIONS

Google says machine learning is the future. So I tried it myself, Alex Hern Jun. 28, 2016 (Year: 2016).*
(Continued)

*Primary Examiner* — Jeffrey A. Smith
*Assistant Examiner* — Lindsey B Smith
(74) *Attorney, Agent, or Firm* — BUCHANAN, INGERSOLL & ROONEY PC

(57) ABSTRACT

A disclosed apparatus and method provide recommendations for products which a customer may need to order and/or items which the customer may have forgotten to order. An exemplary recommendation unit can communicate with a product information database, a product similarity database, a customer purchase history database and a customer order database. The recommendation unit includes a determining unit to store a determined similarity of products in the product similarity database, a training unit to train a model based on information about products previously purchased by each customer and information about at least one
(Continued)

determined similarity as stored in the product similarity database, a similarity unit to generate at least one product similar to at least one product to be purchased by a customer based on information about a current order of a customer, and a calculating unit to calculate a probability that a customer forgot to add a similar product.

20 Claims, 2 Drawing Sheets

(51) Int. Cl.
  *G06N 20/00* (2019.01)
  *G06F 17/18* (2006.01)
(58) Field of Classification Search
  USPC .............................................. 705/26.1–27.2
  See application file for complete search history.

(56) References Cited

U.S. PATENT DOCUMENTS

| | | | |
|---|---|---|---|
| 2003/0212596 A1* | 11/2003 | DiPaolo | G06Q 30/02 705/26.1 |
| 2010/0191582 A1 | 7/2010 | Dicker et al. | |
| 2014/0067597 A1 | 3/2014 | Kirkby et al. | |
| 2014/0074649 A1* | 3/2014 | Patel | G06Q 30/0631 705/26.7 |
| 2016/0210674 A1* | 7/2016 | Allen | G06Q 30/0635 |
| 2016/0300144 A1 | 10/2016 | Santhanam et al. | |
| 2016/0307213 A1 | 10/2016 | Sato et al. | |
| 2019/0108571 A1* | 4/2019 | Kar | G06Q 10/087 |
| 2019/0130305 A1* | 5/2019 | Sivertson | G06N 3/044 |

FOREIGN PATENT DOCUMENTS

| | | | |
|---|---|---|---|
| KR | 20090123398 A | 12/2009 | |
| KR | 20140111225 A | 9/2014 | |

OTHER PUBLICATIONS

Recommended For You: How machine learning helps you choose what to consume next, Jennifer Wei, Aug. 28, 2017 (Year: 2017).*
Machine Learning: What it is and why it matters, SAS, Jan. 7, 2014. (Year: 2014).*
First Office Action dated Sep. 28, 2021, by the Japanese Patent Office in corresponding Japanese Patent Application No. 2020-560580, and an English Translation of the Office Action. (7 pages).
International Search Report (PCT/ISA/210) dated Mar. 3, 2019, by the European Patent Office as the International Searching Authority for International Application No. PCT/EP2019/051704.
Written Opinion (PCT/ISA/237) dated Mar. 3, 2019, by the European Patent Office as the International Searching Authority for International Application No. PCT/EP2019/051704.
Guidotti, Riccardo, et al., "Clustering Individual Transactional Data for Masses of Users", KDD 2017 Research Paper, Aug. 13-17, 2017, pp. 195-204 (via internet: http://www.kdd.org/kdd2017/papers/view/clustering-individual-transactional-data-for-masses-of-users).
Office Action (Examination Report No. 1) dated Jun. 2, 2021, by the Australian Patent Office in corresponding Australian Patent Application No. 2019211047. (6 pages).
Office Action (Final Action) dated May 17, 2022, by the Japanese Patent Office in corresponding Japanese Patent Application No. 2020-560580, and an English Translation of the Office Action. (4 pages).
Mishra et al., "Business Intelligence Using Data Mining Techniques and Business Analytics", Proceedings of the SMART, Nov. 25-27, 2016, pp. 84-89.
Office Action (Request for the Submission of an Opinion) dated Aug. 1, 2022, by the Korean Patent Office in corresponding Korean Patent Application No. 10-2020-7023468, and an English Translation of the Office Action. (8 pages).
Office Action dated Feb. 28, 2023, by the Korean Patent Office in corresponding Korean Patent Application No. 10-2020-7023468, and an English Translation of the Office Action. (14 pages).
Office Action (Examination Report No. 1) dated Jun. 2, 2023, by the Australian Patent Office in corresponding Australian Patent Application No. 2022203839. (3 pages).

* cited by examiner

RECOMMENDATION APPARATUS AND METHOD

This application claims priority from UK Patent Application No. GB1801228.6 filed 25 Jan. 2018, the content of all of this application hereby being incorporated by reference.

This application also claims priority from UK Patent Application No. GB1803405.8 filed 2 Mar. 2018, the content of all of this application hereby being incorporated by reference.

TECHNICAL FIELD

The present invention relates generally to the field of online shopping and more specifically to an apparatus and method for recommending at least one product to a customer.

BACKGROUND

The use of the Internet for conducting electronic commerce is well known. Many retailers now advertise and sell products online. Products of a wide variety are available for purchase online, including products which are electronically delivered to the purchaser over the Internet, for example music. Similarly, physical products, for example books, can be ordered online and delivered through conventional distribution means. Companies typically set up electronic versions of their catalogue, which are hosted on server computer systems, with lists of products available. A customer may browse through the catalogue using an Internet browser and/or a mobile application on a smart phone and select various products that are to be purchased. When the customer has completed selecting the products to be purchased, the server computer system then prompts the customer for information to complete the ordering of the products. This purchaser-specific order information may include the purchaser's name, the purchaser's credit card number, and a shipping address for the order. The server computer system then typically confirms the order by sending a confirming Web page/mobile application page to the client computer system and schedules shipment of the products.

The selection of the various products from the electronic catalogues is typically based on the model of a virtual shopping basket. When the purchaser selects a product from the electronic catalogue, the server computer system metaphorically adds that product to a virtual shopping basket. When the purchaser is done selecting products, then all the products in the shopping basket are "checked out" (i.e., ordered) at which point the purchaser provides billing and shipment information. In some models, when a purchaser selects any one product, then that product is "checked out" by automatically prompting the customer for the billing and shipment information.

Although online shopping has a number of benefits with respect to brick and mortar shop shopping such as convenience and range of products, a number of disadvantages exist with respect to online shopping:

The order takes at least few hours to be delivered (or even a whole day), while in physical shops products are available immediately after a customer walks into the shop. This means that if a customer needs to get the required product immediately, then he/she is forced to use a brick and mortar shop. Customers shopping online try to plan what they will need in advance to avoid such situations; and A customer is charged for delivery. In order to amortize this fee, online customers will tend to place bigger orders when compared to traditional shops at a brick and mortar shop.

Sometimes an online customer may forget to add some products he/she needed to the virtual basket. In such a case, the customer could potentially place another online order, however customers won't want to wait a long time for delivery of the product and the cost of a single product/handful of products won't be enough to compensate for the delivery fee. Therefore, the customer will be forced to shop for the forgotten product in a traditional manner at a brick and mortar shop.

Physical shops typically have a narrow range of products when compared to online retailers, therefore, it's possible that the product a customer forgot to order online won't be available in their local shop, which contributes to an even worse customer experience.

This situation is negative for an online retailer in at least two ways:
  (minor) average virtual basket size is lower; and
  (major) a customer may be less likely to shop online next time.

In typical online shopping experiences, customers are required to pass through different phases of the shopping experience. First, a customer browses the catalogue of an online shop and adds products to a virtual basket. To purchase the products the customer must proceed to a virtual checkout.

Typically product recommendations are displayed to a customer before checkout by presenting products the customer may like, but which have never previously been purchased. As a result average basket size can be increased, the average spend per customer per day is increased and the range of products purchased by a customer is expanded.

In "Clustering Individual Transactional Data for Masses of Users" (http://www.kdd.org/kdd2017/papers/view/clustering-individual-transactional-data-for-masses-of-users) there is proposed a personal assistant which recommends types of products that should be added to the virtual basket. This is done based on a customer shopping history and current content of the basket. However, it is difficult to adapt this paper to predict concrete products to be added to the virtual basket instead of types of products.

Moreover, a number of problems exist with both a typical product recommendation solution and "Clustering Individual Transactional Data for Masses of Users", in particular:

"Clustering Individual Transactional Data for Masses of Users" only suggests the products that have been already purchased by a customer. For example, if the customer is shopping for the ingredients for a Mexican dish and forgot to add tortillas to the virtual basket, having never bought tortillas before, then tortillas won't be recommended to the customer;

"Clustering Individual Transactional Data for Masses of Users" only recommends types of products to the customer like "milk" or "bread". While this is useful, it doesn't tell which particular product should be recommended, which is the information useful to the customer.

Both solutions don't take into account trends on the market and seasonality. If customer shops for turkey only in Christmas period, then this particular product has very low chance of being displayed to the customer before next Christmas.

SUMMARY

In view of the problems in known recommendation systems, the present invention aims to provide an apparatus and method to provide recommendations for products which a customer may need to order and/or products which the customer may have forgotten to order.

According to the present invention there is provided a recommendation unit arranged to communicate with a product information database, a product similarity database, a customer purchase history database and a customer order database. The recommendation unit comprises a determining unit arranged to determine at least one similarity between information about a product stored in the product information database and information about at least one other product stored in the product information database and arranged to store the at least one determined similarity in the product similarity database. The recommendation unit further comprises a training unit arranged to train a model based on information about products previously purchased by each customer as stored in the customer purchase history database and information about at least one determined similarity as stored in the product similarity database and a similarity unit arranged to generate at least one product similar to at least one product to be purchased by a customer based on information about a current order of a customer stored in the customer order database and information about determined similarities as stored in the product similarity database. The recommendation unit also comprises a calculating unit arranged to calculate using the trained model, for each generated at least one similar product, a probability that a customer forgot to add the at least one similar product to the at least one product to be purchased by the customer.

There is also provided a recommendation system comprising a product information database, a product similarity database, a customer purchase history database, a customer order database and a recommendation unit as previously described.

There is also provided a method for providing recommendations. The method comprises the steps of determining at least one similarity between information about a product stored in a product information database and information about at least one other product stored in the product information database, storing the at least one determined similarity in a product similarity database, training a model based on information about products previously purchased by each customer as stored in a customer purchase history database and information about at least one determined similarity as stored in the product similarity database, generating at least one product similar to at least one product to be purchased by a customer based on information about a current order of a customer stored in a customer order database and information about determined similarities as stored in the product similarity database and calculating using the trained model, for each generated at least one similar product, a probability that a customer forgot to add the at least one similar product to the at least one product to be purchased by the customer.

BRIEF DESCRIPTION OF THE DRAWINGS

Embodiments of the invention will now be described by way of example only with reference to the accompanying drawings, in which like reference numbers designate the same or corresponding parts, and in which.

DETAILED DESCRIPTION OF EMBODIMENTS

First Embodiment

Figure 1:
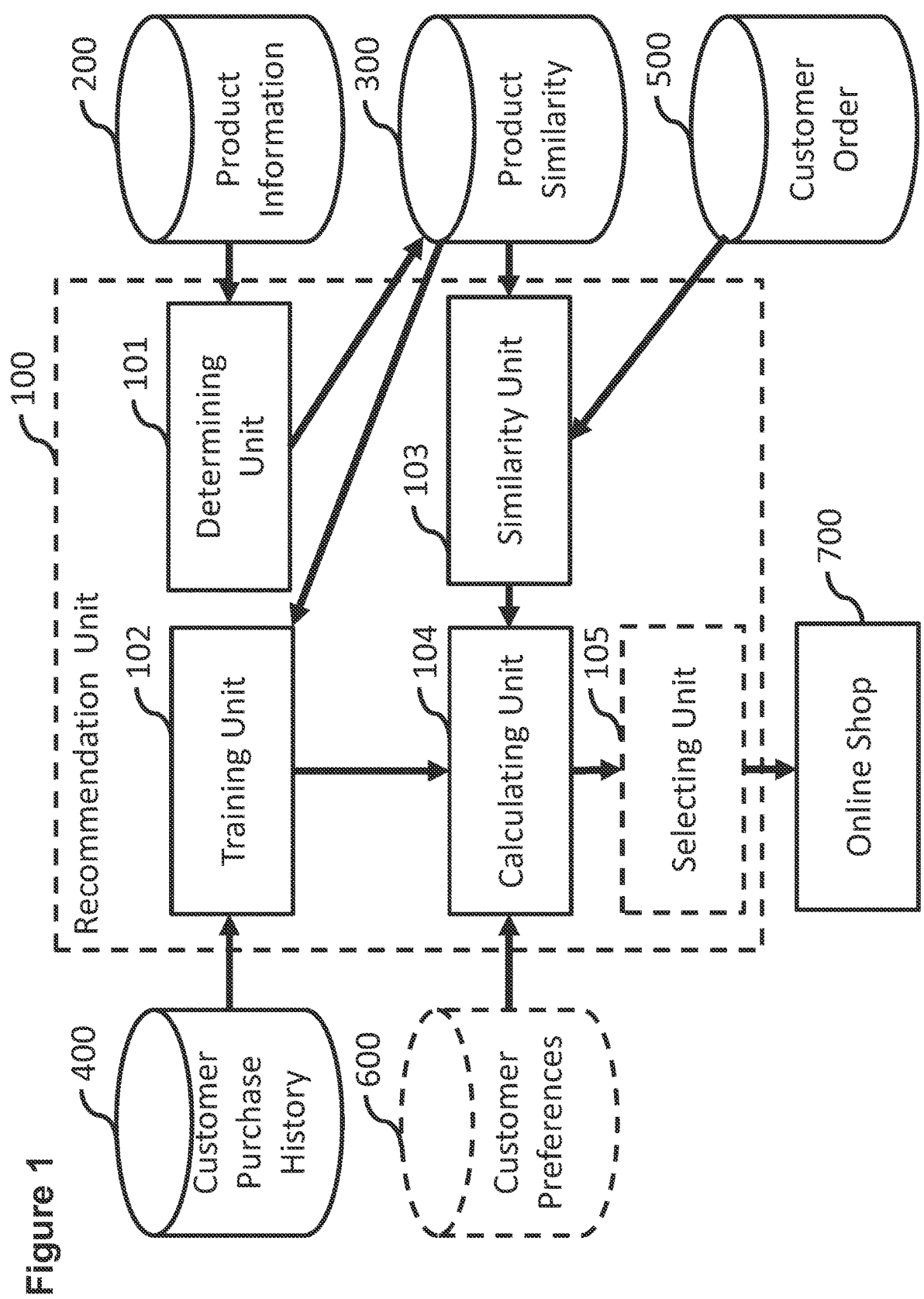
FIG. 1 shows a schematic diagram of a recommendation unit according to a first embodiment of the present invention.

FIG. 1 depicts a recommendation unit 100 according to the first embodiment of the present invention. In this embodiment, the recommendation unit 100 is arranged to communicate with a number of databases. More specifically, the recommendation unit 100 is arranged to communicate with a product information database 200, a product similarity database 300, a customer purchase history database 400 and a customer order database 500. Optionally, the recommendation unit 100 may be arranged to communicate with a customer preferences database 600.

The product information database 200 is arranged to store a variety of data concerning the products offered for sale in an online shop 600. For example, the product information database 200 may store at least one: product ingredients, product name, product information detailed on a label of the product, tags/information assigned to the product by a manufacturer of the product and tags/information assigned to the product by a reseller and/or distributor of the product.

For example, if the product is a food product then a list of ingredients shown on the label of the product may be stored in the database. Moreover, the manufacturer/reseller/distributor may store other information relating to the product which may or may not be shown on the label of the product and with which the product has been tagged. For example, whether the product is gluten-free, suitable for vegetarians or is kosher. As will be appreciated, a variety of other types of product information may also be stored in the product information database 200.

The product similarity database 300 is arranged to store identified similarities between the products stored in the product information database 200. For example, if the product information database 200 stores information about one ketchup product and one mustard product then the product similarity database 300 may be arranged to store information that the two products are "similar", in other words that they relate to similar products in the same category, in this case that the two products are both condiments and a customer purchasing ketchup may usually also purchase mustard. Similarly, if the product information database 200 stores information about toilet tissues and hand soap then the product similarity database 300 may store information that the toilet tissue is similar to the hand soap because customers may purchase 'bathroom products' of toilet tissues and hand soap together.

Moreover, if the product information database 200 stored information about a ketchup product manufactured by a company A and a ketchup product manufactured by a company B then the two ketchup products are "similar" because they may be used interchangeably by a customer.

The customer purchase history database 400 is arranged to store information about each customer and the products they have purchased over a predetermined period of time. For example, the last six months' worth of purchases.

The customer order database 500 is arranged to store information about an order to be placed by a customer. In other words, the customer order database 500 stores information about the products currently in place in a customer's virtual basket and which the customer wishes to purchase/ order and for which will perform a checkout process to order those products. Moreover, the customer order database 500 may store other information about a customer's current order, for example, the date and time at which the delivery is booked, together with specific information about the customer such as email address, phone number, address etc.

Optionally, a customer preferences database 600 is provided. The customer preferences database 500 is arranged to store information concerning the customer's preferred products. For example, the online shop 600 may directly ask a customer a question, by way of a web page and/or a screen of a mobile application, such as asking whether the customer prefers the ketchup manufactured by a company A. The answer provided by the customer may be stored in the customer preferences database 600 and be used by the recommendation unit 100 to refine the probabilities calculated.

The online shop 700 provides a catalogue of products which may be selected and/or purchased by a customer visiting the online shop 700. The online shop 700 may utilise any number of different means to have the customer browse and/or purchase products. Typical examples include web pages which may be visited from web browsers on desktop/laptop computers. Moreover, the online shop 700 may provide a similar experience on mobile devices such as smartphones/tablets either by way of a web page and/or a mobile application specifically designed for the mobile device. As will be appreciated, any number of other technologies may be utilised to allow customers to browse and/or purchase products from a catalogue.

With specific reference to the recommendation unit 100, the recommendation unit 100 of the first embodiment of the present invention is arranged to determine a similarity between products based on product information stored in the product information database 200. The recommendation unit 100 is further arranged to calculate a probability about at least one product that a customer forgot to add to the customer order.

More specifically, the recommendation unit 100 comprises a determining unit 101, training unit 102, similarity unit 103 and a calculating unit 104. Optionally, the recommendation unit 100 may comprise a selecting unit 105.

The determining unit 101 is arranged to determine relationships between products based on product information. More specifically, the determining unit 101 may determine similarities between products, information about which is stored in the product information database 200, and then store the determined similarities in the product similarity database 300. For example, the product information database 200 may store information about different products including information about the product name, product ingredients and/or additional information assigned to the product by the manufacturer/distributor/reseller. The product information is used by the determining unit 101 to determine similarities of the products to other products based on the product information. The determined similarities are then stored in product similarity database 300.

By way of example, the product information database 200 may store information on three products such as rice (called "Product 1"), curry sauce (called "Product 2") and bleach (called "Product 3"). The determining unit 101 may be arranged, for each product, to compare the product to the other products in the product information database 200 to thereby determine similarities (if they exist) between the products. In this example, the determining unit 101 may determine a similarity between Product 1 and Product 2 because they are both related products in that customers may typically purchase rice to create a curry dish and therefore are likely to also purchase curry sauce for use with the rice. Accordingly, the determining unit 101 may be arranged to store, in the product similarity database 300, that Product 1 is similar to Product 2, along with information about Product 1 and Product 2. To determine the similarity, the determining unit 101 may be arranged to compare product names, product sizes, product weight, product ingredients and/or information assigned to the product by the manufacturer/distributor/reseller.

Similarly, the determining unit 101 will also examine Product 2 and determine that it's similar to Product 1, however, because this similarity has already been determined when examining Product 1 may disregard this result because this similarity has already been stored in the product similarity database 300. In another example, the determining unit 101 may be arranged to only determine a similarity with those products which have not yet been examined in the product information database 200.

Next the determining unit 101 will examine Product 3. However, Product 3 is not similar to either Product 1 or Product 2, therefore no similarity information about Product 3 will be stored in the product similarity database 300. As will be appreciated, the product information may store many more products than given in this example.

However, the above example is one determined similarity between products. In another example the product information database 200 may store information about a ketchup product manufactured by a company A and a ketchup product manufactured by a company B. Therefore, the determining unit 101 may determine that the two ketchup products are "similar" because they may be used interchangeably by a customer in that they relate to the same product but manufactured by different companies.

In one non-limiting example product similarities are found using a neural net. The neural net may be used to map products into multi-dimensional vectors of real numbers (called embedding). For each vector (product) other vectors (products) are found which are close by in terms of distance—as a vector is a point in D dimensional space.

The present inventors have found, advantageously, that the operations performed by the determining unit 101 may be performed "offline", that is separately from a particular customer placing an order. In this way, irrespective of the products to be ordered by a customer, the similarities in the product similarity database 300 can be stored without need for interaction with the customer. Moreover, once the list of similarities in the product similarity database 300 has been formed, then the similarities need not change unless the product changes or new products are added. The present inventors envisage that an online retailer would have the determining unit 101 perform similarity analysis for all of the products based on the product information stored in the product information database 200. Thereafter, the determining unit 101 need only repeat the similarity determination for those products that change in some way, for example, changing ingredients. Moreover, the determination unit 101 would determine similarities for new products which are recently added to the product information database 200.

The training unit 102 is arranged to train a model for calculating a probability of a customer having forgotten a product. The model is trained based on customer order history information in the customer order history database 400 and product similarity information from the product similarity database 300.

The present inventors, having considered the disadvantageous previous solutions to the problem of forgotten products have effectively applied cloud and machine learning (ML) to the problem by way of the model trained by the training unit 102. Surprisingly, the present inventors have found that the application of ML to the specific application of forgotten products results in improved speed and adaptability, as compared to previous solutions. Moreover, as customers' purchasing habits change the recommendation unit 100 can learn the new patterns more quickly than the previous solutions.

The machine learning model evolves based on the current environment and thereby predicts future trends.

The training unit 102 may utilise data collected from past orders (as stored in the customer order history database 400). Moreover, the training unit 200 may utilise determined similarities of products (as stored in the product similarity database 300). The retrieved information may thereby be used as training data to train a more reliable model.

In this way, the training unit 102 utilises, for example, historical behaviour of the customer from the customer order history database 200, for example, previous orders, products per order in the past and in the future, average price of order, etc. Moreover, the use of product similarities may be used to consider the products purchased in previous customer orders so as to identify patterns of product purchasing behaviour such as products which are likely purchased together.

The model may be trained a single time and then used by the calculating unit 104 thereafter. Alternatively, the model may be re-trained after a predetermined period of time to thereby update the model as the behaviour of customers' changes. Moreover, the model may be trained "offline", that is, separate from a particular shopping experience by a customer. In this way, the model need not be trained (which is a particularly computationally intensive process) whilst serving customers but instead calculated at a time when few customers are being served. Alternatively, the model may be re-trained on a computer separate to the computer serving customers. Therefore, re-training may happen in parallel to serving customers, however, re-training the model is computationally intense and typically is a long running process, therefore to minimise the costs associated with long running processes (such as electricity costs and/or computer hire costs) the model may be re-trained infrequently.

The similarity unit 103 is arranged generate at least one product similar to a product in the customer's current order, information about which is stored in the customer order database 500 and product similarity information stored in the product similarity database 300. More specifically, the similarity unit 103 is used when a customer had finished adding products for purchase to their "virtual basket" and is ready to check out the order by paying for the products in the their virtual basket. However, before the customer checks out the order, the similarity unit 103 examines each product in the virtual basket (i.e. in the customer's current order) and generates products similar to the products in the customer's virtual basket. The similarity unit 103 achieves this by way of the product similarity database 300 which stores information of similarities between products. Therefore, the similarity unit 103 looks up the products in the customer's basket and generates at least one similar product from the product similarity database 300.

The calculating unit 104 is arranged to calculate a probability of a customer having forgotten to include at least one product in their order based on the generated similar products from the similarity unit 103. More specifically, the calculating unit 104 may utilise the model trained by the training unit 102 to thereby calculate a probability of a customer forgetting to include a similar product in their order based on the similar products generated by the similarity unit 103. For example, if the customer's virtual basket (information about which is stored in the customer order database 500) contains a curry sauce product then, for example, the similarity unit 103 may generate similar products for use by the calculating unit 104. For example, the similarity unit 103 may generate the following products as similar products to "curry sauce": rice, naan bread and papadums. Therefore, information about the three similar products is input into the calculating unit.

Thereafter, the calculating unit 104 examines each similar product is turn to calculate, based on the trained model, the probability of a customer forgetting to include each similar product in their order. For example, the calculating unit 104 may first calculate a probability, using the trained model, whether the particular customer with particular products in the order has forgotten to include the product "rice" in their order. Next, the calculating unit calculates the probability that the customer has forgotten to include "naan bread" in the order. Next, the calculating unit calculates the probability that the customer has forgotten to include "papadums" in the order. In one non-limiting example, the trained model may need to be input with information about the customer, the particular order being placed (i.e. information about all of the products in the order), and the similar product about which the calculation is to be performed. In this way, the context of the order may be considered when calculating the probability of the similar product having been forgotten.

It is important that the calculation performed by the calculation unit 104 occurs rapidly so that recommendations to a customer are presented quickly, desirably in under 200 ms. Given the fact that a typical online retailer may range about 50,000 products it is hard if not impossible to achieve the speed if the probability calculation were to be performed across all products in the product information database 200. Therefore, the present inventors have narrowed the search space to only perform probability calculations for those products considered similar to the products in the customer's virtual basket.

Optionally, the calculating unit 104 may receive from a customer preferences database 600 information about preferred products of the customer. For example, a particular brand of rice the customer prefers to order, a particular size of naan bread the customer prefers to order and/or a papadum product the customer has previously purchased. Similarly, the customer preferences database 600 may store information about a product a customer has specifically marked as favourite, for example, a preferred/favourite chocolate product of the customer.

Therefore, the calculating unit 104 may be arranged to also calculate the probability that the customer forgot to include a preferred/favourite product in the order. For example, if the customer has a favourite chocolate product, the calculating unit 104 may calculate a probability that the customer forgot to include the favourite chocolate product in the order using the trained model based on information about the customer and information about the other products in the order.

The calculated probability for each product may then be used by the online shop 700 to recommend to a customer products which the customer may have forgotten to include in the order.

Optionally, the recommendation unit 100 may further comprise a selecting unit 105 arranged to receive at least one calculated probability from the calculating unit 104 and arranged to select/sort/filter the at least one calculated probability, together with the similar product to which it refers. For example, if the calculated probability relates to a rice product then the selecting unit 105 may be arranged to select/sort/filter the rice product.

In one non-limiting example, the selecting unit 105 may be arranged to sort all of the similar products retrieved from the calculating unit 104 based on the calculated probability for each similar product. For example, if the calculated probabilities relate to rice, naan bread and papadum products then the selecting unit 105 may be arranged to sort the three products based on the calculated probability so that the similar product with the highest calculated probability (and therefore the highest probability of being forgotten by the customer) appears first. In this way, the online shop 700 may be arranged to recommend to the customer those products with a higher likelihood of being forgotten with more prominence than those with a lower probability of having been forgotten.

Moreover, the selecting unit 105 may be further arranged to threshold the similar products to restrict the number of a product to a predetermined number, for example, 50 products. Moreover, combined with sorting by calculated probability, only the top 50 products, as sorted by calculated probability may be used by the online shop 700. Additionally or alternatively, the thresholding may be performed to only select those similar products with a minimum calculated probability, for example 50%. In this way, only those similar products which are more likely than less likely of being forgotten are recommended to the customer.

Additionally or alternatively, the selecting unit 105 may be arranged to filter the similar products based on at least one of: products to be purchased by the customer (i.e. the products already present in the customer's virtual basket), products unavailable for order in the customer's chosen delivery slot (for example, those products which are out of stock) and/or products which are illegal to promote (for example, formula milk for infants for which promotion in the UK is prohibited). In this way, those similar products which should not be recommended to the customer are removed before they are recommended to the customer.

The following describes, in more mathematical terms, the operations performed by the recommendation unit 100 based on the following notation:
c—customer
i—item/product
o—the current order being placed by the customer
Basket(o)—items in the virtual basket of current order (stored by the customer order database 500)
Similar(i)—items similar to product i
P(c, i, o)—the probability that customer c forgot to add item i for the current order o. This is calculated using a model in real time by the calculating unit 104.
Favourites(c)—preferred/favourite items of customer c as stored in the customer preferences database 600. An item can become a favourite in, for example, one of the following ways:
  It was bought by customer c previously
  It was explicitly marked by a customer c as favourite (for example by selecting an icon on an item page of a website/mobile application)
Optionally, "feature"—which is a single data variable used by model P in real time to make a decision. Features are both offline (calculated every day) and online (calculated just before passing it to the model P)

The present inventors envisage a customer taking the following process to purchase products by way of an online retailer:
  Customer starts shopping by entering the website or mobile application;
  Customer may decide to choose a delivery slot, i.e. date and time when the order should be delivered. This may be done later by the customer, but not before a checkout action is performed;
  Customer adds products/items to a virtual basket;
  Once customer is ready to place an order, the customer is presented with at least one webpage/mobile app screen which recommends products. On at least one webpage/mobile app products are recommended to the customer which are products the customer may have run out of or have forgotten to add to the virtual basket. Customer can add products to the virtual basket directly from the at least one recommendations webpage/mobile screen. The products to be recommended to the customer are generated by the recommendation unit 100 according to the first embodiment of the present invention; and
  The customer places an order.

In this way, online shopping is made easier for customers, by reminding them when they have forgotten a product.

As described previously, certain operations can be performed 'offline' that is unconnected from a customer placing an order which may be advantageous because those operations may be computationally intense and therefore by performing them offline allows optimal selection of a period of time at which the fewest customers are shopping. Alternatively or additionally, by allowing the selection of an appropriate time to run the computationally intense process (and therefore, typically, a long running process) costs can be minimised by choosing a time when, for example, electricity costs and/or computer hire costs are minimal, such as during the night. More specifically, the following operations may be performed offline every day:
  Determine, by the determining unit 101, Similar(i) for each product that is being sold by the online shop 700;
  Calculate offline features; and
  Train, by the training unit 102, the machine learning model P(c, i, o) based on historical data.

When customer c visits the recommendation webpage/mobile screen with an order o, the following may occur:
  The similarity unit 103 generates a set of items similar to the items currently in the Basket(o). This is may be performed so as to ensure that products that may have never been bought by customer c, but are relevant in the context of order o are considered;
  The calculating unit 104 calculates, for each item i in Favourites(c)+Similar(Basket(o)) the value of P(c, i, o). Advantageously, the calculation occurs in real time, to achieve this calculations for each i are parallelized;
  The selecting unit 105 sorts the list of items in Favourites (c)+Similar(Basket(o)) by the metric P(c, i, o) in descending order;
  The selecting unit 105 selects the first 50 items with highest value of P(c, i, o);
  The selecting unit 105 filters, out of the 50 items based on:
    currently present in the customer's virtual basket
    unavailable ("out of stock") for chosen delivery slot
    illegal to promote on the website due to marketing rules (an example would be infant formula for which advertising is prohibited in the UK); and
  The online shop 700 recommends the remaining items left to the customer.

With specific references to the training unit 102, training and serving predictions of P(c, i, o) model may include features, i.e. data variables. The present inventors envisaged the below list of data variables, however, other data variables may be used.

For each customer who has already placed an order previously and each product that could be displayed to the customer the following information may be calculated:

How many days ago the customer bought this product;
How many orders of a particular product a customer has ordered before;
What is the percentage of past customer's orders containing this product;
What is the discounted in time number of past customer's orders containing this product. This is the sum of series when each element reflect one order containing this product and is equal to the discounting factor (for example, this now 0.9925 raised to the power of how many days ago this order was delivered);
Separately for a few past orders (for example, 5 past orders) it is whether a product was included in this order;
If a customer has searched for similar product;
If a customer has already seen this/similar product but have not added it to the basket;
If there is already similar product in the current customer basket;
If there are in the basket any product that are bought often together based on past personal customer shopping behaviour and general patterns across all customers; and
If the customer marked the product as not being a favourite product.

For each customer the model may use the following information:

How many orders a customer has ordered previously;
What is the average number of products a customer placed in an order;
How many days have passed since a first order of this customer;
How many days have passed since a previous order of a particular customer;
What is the average number of days between a customer's orders;
What is the median number of days between a customer's orders; and
How many distinct products has a customer bought previously.

For each product the model may use:

What percentage of all orders in the last few days contained this product, for example, for 7, 31 and 93 days;
What percentage of all orders contained this product in the last few days but counting only the same days of week as the day in which the model is , for example, for 7, 31 and 93 days;
Product description and images; and
List of substitutes for the product.

For each order the model may use:

List of products present in the virtual basket; and
Date and time of the delivery Initially, when considering products to be recommended to a customer the following are not taken into account:

customer's favourites;
products which are similar to the favourites; and
products already in the customer's basket.

The present inventors do not consider the above products in the initial recommendation because, in this way, it is possible to provide a customer with a richer set of possibly forgotten products. For example, where a customer is buying ingredients for Mexican dish, even if a tortilla was never bought by this particular customer before then this allows the recommendation unit 100 to recommend a tortilla product to the customer.

Moreover, the recommendation unit 100 allows for adjustment based on seasonality.

Figure 2:
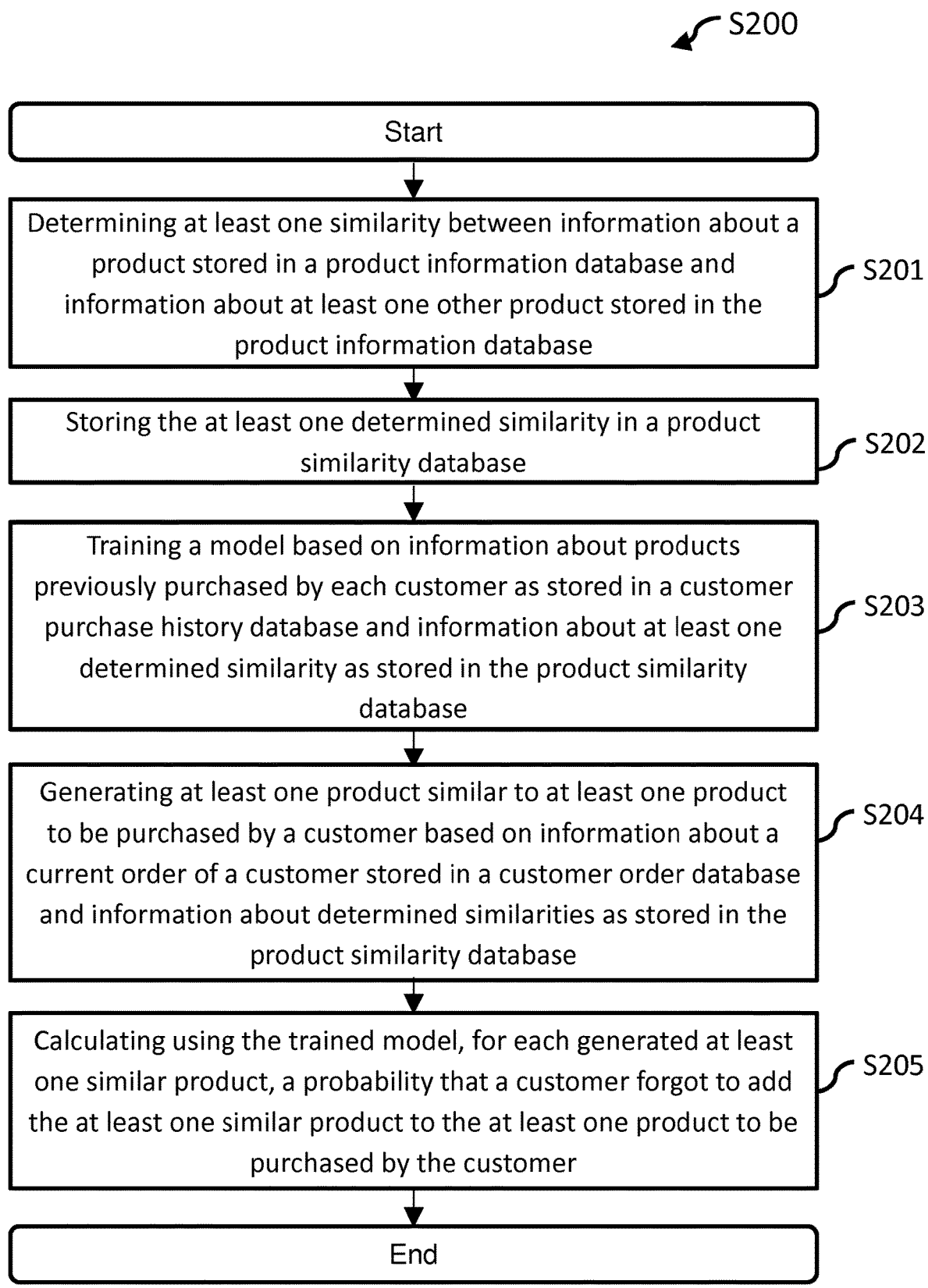
FIG. 2 shows a flowchart of a method performed by a first embodiment of the present invention.

FIG. 2 depicts a flowchart of a method S200 according to a first embodiment of the present invention. The method S200 provides recommendations for an online shop to provide to a customer of products which they customer may wish to add to an order they are to place. The products may comprise products which the customer may have run out of since their last order and/or products which the customer may have forgotten to add to the order during their shopping experience of browsing a catalogue of products and adding products to a virtual basket.

At step S201 the method determines at least one similarity between information about a product stored in a product information database and information about at least one other product stored in the product information database. Therefore 5201 compares products available for purchase on an online shop and finds similarities (if any exist) between products. For example, the similarities could be that the products are usually purchased together, based on information about all of the customers using the online shop. Additionally or alternatively the products could be products which are categorised the same by the online shop such as "cleaning products", "health products" and/or "ingredients for a Mexican dish". To achieve this, step S201 retrieves information about products from a product information database and compares at least two of the products. The information may comprise the name of the product, the ingredients of the product, tag/information assigned to the product by the manufacturer/distributor/reseller. The present inventors envisage that step S201 would be applied to all products on sale by an online shop for which information about all of the products is stored in the product information database.

Alternatively or additionally, step S201 may determine similarities between products which may be used interchangeably such as products which comprise similar ingredients or purposes but which are manufactured by different companies. Accordingly, the customer's preference of one product over another may come down to cost, size/weight of the product, brand name and/or customer choice.

At step S202, based on the comparison performed in step S201, if similarities between the products are found, then each similarity, together with information about the compared products is stored in a product similarity database. Because products don't often change, one similarities between products have been determined and store in the product similarity database the present inventors envisage that step S201 need not be re-performed. Instead, the present inventors envisage that step S201 need only be performed on products that have changed and/or products which have been newly added to the product information database. In this way, computational resource is not wasted. Moreover, the determining and storing of similarities may be performed "offline", i.e. disconnected from a particular customer making an order. In this way, the determining and storing can be scheduled for a period of maximised computational resource, such as when few customers are using the online shop and therefore the maximum amount of computational resource is available.

At step S203 a model is trained based on information about products previously purchased by each customer as stored in a customer purchase history database and product similarities as stored in the product similarity database 300. At this step S203 a model, for example, a machine learning model, is trained in customers' behaviours based on previous purchases made by customers and similar products of those orders, for example, products which are commonly purchased together. In this regard, previous customers' purchases are stored in a customer purchase history database. For example, the database may store information about specific orders placed by customers including a customer's name, address, products purchased, date and time of delivery etc. On the other hand, product similarities are stored in the product similarity database.

At step S204 at least one similar product is generated based on a customer's current order. More specifically, at least one product similar to at least one product to be purchased by a customer is generated based on information about a current order of a customer as stored in a customer order database and information about determined similarities as stored in the product similarity database. In this example, the products to be ordered by a customer are stored in a customer order database. At this stage, the customer has not placed the order i.e. paid for the order and/or confirmed the order. Instead, the customer has selected items from an online shop which they intend to purchase. The customer next intends to confirm/purchase the products. However, between these two stages step S204 examines the products the customer intends to purchase and generates products similar to the products the customer intends to purchase. For example, if the customer has a Mexican spice mix product and a chicken product in their virtual shopping basket (i.e. amongst the products they intend to purchase) then the generating step S204 may generate tortillas, salsa and sour cream as similar products. In other words the generated similar products are ingredients of a Mexican dish. Step 5204 achieve the generation of similar products by comparing each product to be purchased by the customer with information in the product similarity database. More specifically, the generating step S204 may use an identifier of a product to lookup in the similarity database products which were identified by step S201 to be similar to the product to be purchased. In this way, products in a customer's virtual basket can be equated with similar products previously determined to be similar and stored in the similarity database.

At step S205 a probability that a customer forgot to add and/or has run out at least one similar product is calculated. More specifically, at step S205 each similar product is examined in turn, i.e. tortillas, salsa and sour cream are each evaluated individually. In the evaluation, the trained model is used to calculate a probability that a customer forgot to add/has run out of the similar product to the products in the virtual shopping basket i.e. the products the customer desires to order. Therefore, in this example, three probabilities are calculated, one for each similar product of tortillas, salsa and sour cream. To calculate the probability the model may take into account the products to be purchased by the customer i.e. the products in the customer's virtual basket.

Thereafter, the calculated probabilities may be used by the online shop to show those products which a customer may have forgotten to add/has run out of in the online shop.

In a non-limiting example, the method S200 may, optionally, communicate with a customer preferences database which stores information on each customer's favourite/preferred products. A product may be marked as favourite/preferred because a customer has previously purchased the product and/or the customer has identified the product as a favourite/preferred by selecting an icon on the online shop. The calculating step S205 may use the information about a customer's preferred products to adjust the products for which the probability that a customer forgot a product is calculated. More specifically, as well as the features described previously with regard to the calculating step S205, the method S200 may further examine each favourite/preferred product, information about which is stored in the customer preferences database. Based on each examined item, the trained model may be used to calculate a probability that the customer forgot to include the favourite/preferred product with the products to be purchased i.e. the products in the virtual shopping basket.

In another non-limiting example, the method S200 may further select at least one product from the generated similar products based on the calculated probability for that generated similar product. More specifically, the selecting step may select similar products based on the calculated probability. For example, the selecting unit may sort the similar products by the calculated probability so that those similar products most likely forgotten by the customer are highest such that the online shop displays them with greater prominence. Additionally or alternatively, the similar products may be subject to a threshold such that only those similar products with a calculated probability greater than a predetermined threshold are provided to the online shop. In this way, those products, for example, with a low calculated probability are not provided to the online shop. Additionally or alternatively, the similar products may be filtered based on, at least one of products to be purchased by the customer, products unavailable for order in a customer's chosen delivery slot, products illegal to promote. In this way, the online shop may receive those products which are best displayed to a customer.

Thereafter, the online shop may display the similar products on a particular webpage/mobile application screen recommending products to a customer. For example, the online shop may display with more prominence those products which have a high probability of being forgotten by the customer to be included in the customer's virtual shopping basket. Thereby, products which the customer may have run out of and/or forgotten to include in their order are recommended to customers.

Modifications and Variations

Many modifications and variations can be made to the embodiments described above, without departing from the scope of the present invention.

For example, the above described first embodiment may use 'embeddings' (also referred to as 'word embeddings') to determine the similarity of products. In this regard, 'embeddings' may be, in this context, referred to as 'product embeddings'. A product embedding assigns, to every product, a mathematical vector of a predetermined length, for example, a cucumber may be represented as [1.0, −0.9, 7.0], i.e. a vector of real numbers. Such a representation has many advantages, especially when used with machine learning. In particular, product embeddings allows for easier definitions of similar and complementary products to help better discover relationships between products. Moreover, it permits the discovery of patterns in customer behaviours, and understand customer shopping basket content. In this way, a product is mathematically embedded from a space with one dimension per product to a continuous vector space with a lower dimension.

In particular, the determining unit may be arranged to determine at least one similarity between information about a product stored in a product information database and information about at least one other product stored in the product information database based on product embeddings. For example, each product may be assigned a mathematical vector (the mathematical vector being stored in the product information database) and similarities between products determined based on the stored mathematical vectors.

Additionally or alternatively, the similarity unit may be arranged to generate at least one product similar to at least one product to be purchased by a customer using product embeddings. For example, the similarity between products as expressed by the mathematical vectors assigned to each product as a product embedding may be used to determine the at least one similarity.

Examples of software which may be used with regards to product embeddings are "word2vec" and/or "doc2vec". Word2vec provides efficient estimation of work representations in vector space whilst doc2vec provides distributed representations of sentences and documents.

The foregoing description of embodiments of the invention has been presented for the purpose of illustration and description. It is not intended to be exhaustive or to limit the invention to the precise form disclosed. Modifications and variations can be made without departing from the spirit and scope of the present invention.

The invention claimed is:

1. A recommendation computer arranged to communicate with a product information database, a product similarity database, a customer purchase history database and a customer order database, the recommendation computer comprising:
   program code that, when executed, causes the recommendation computer to:
      determine at least one similarity between information about a product stored in the product information database and information about a product stored in a customer's virtual basket and, if there is a determined similarity, store the at least one determined similarity in the product similarity database, wherein the similarity is based on at least one of a product category, a product name, product ingredients, and products in a recipe;
      train a model for calculating a probability that a product should be included in a customer's current order based on information about products absent from the customer's virtual basket and previously purchased by at least the customer as stored in the customer purchase history database and information about at least one determined similarity relating to the previously purchased products absent from the customer's virtual basket including at least one of: if the customer has searched for a similar product and if the customer has already browsed for a particular/similar product but has not added it to the current order, as stored in the product similarity database;
      generate information regarding at least one product that is absent from the customer's virtual basket and similar to at least one product to be purchased by the customer based on information about the current order of the customer stored in the customer order database and information about determined similarities as stored in the product similarity database;
      provide the at least one product determined to be similar to at least one product included in the customer's current order and that is not currently stored in the customer's virtual basket as an input to the trained model, and, for each at least one similar product, calculate a probability that the at least one similar product should be included in the current order, the probability being calculated as a function of at least preferred products identified by the customer and a purchase history of the customer;
      recommend to a computing device of the customer, product or products which should be included in the order based on the probability or probabilities output by the trained model; and
      retrain the model based on recommended products selected for purchase by the customer.

2. The recommendation computer according to claim 1, wherein, by executing the program code, the recommendation computer is further configured to train the model based on at least one or more of:
   how many days ago the customer bought a particular product;
   how many orders the customer previously placed containing a particular product;
   what percentage of the customer's past orders contained a particular product;
   for a predetermined number of past orders, whether those past ordered included a particular product;
   if a product to be purchased by the customer stored in the customer order database includes a similar product;
   if a product to be purchased by the customer as stored in the customer order database has been previously purchased together with another product, based on the customer's past shopping behaviour and patterns based across other customers;
   if the customer marked a particular product as not being a favourite product;
   how many orders the customer has had delivered before;
   an average number of products per customer order;
   number of days since the customer's first order;
   number of days since the customer's previous order;
   average number of days between the customer's orders;
   median number of days between the customer's orders;
   number of distinct products purchased previously by the customer;
   percentage of all orders in a preceding predetermined number of days contained a particular product;
   product description and images;
   list of substitutes for a particular product;
   list of products to be purchased by a customer; or
   date and time of delivery.

3. The recommendation computer according claim 2, in a recommendation system combination, the recommendation system including a customer preferences database,
   wherein the recommendation computer is configured to communicate with the customer preferences database,
   wherein the program code, when executed, causes the recommendation computer to calculate using the trained model, for each at least one similar product absent from the customer's virtual basket and for each at least one product absent from the customer's virtual basket and favoured by the customer as stored in the customer preferences database, a probability that the at least one similar product should be included in the current products in the customer's virtual basket or the at least one favoured product to the current products in the customer's virtual basket having at least one product to be purchased by the customer.

4. The recommendation computer according to claim 3, wherein the program code, when executed, causes the recommendation computer to:
  select at least one product from among one or more at least one similar product absent from the customer's virtual basket based on the calculated probability for the at least one similar product.

5. The recommendation computer according to claim 4, wherein the program code, when executed, causes the recommendation computer to sort the at least one or more similar products by the calculated probability for the at least one or more similar products absent from the customer's virtual basket.

6. The recommendation computer according to claim 5, wherein the program code, when executed, causes the recommendation computer to filter the at least one or more similar products based on at least one or more of:
  products to be purchased by the customer;
  products unavailable for order in a customer's chosen delivery slot; or
  products illegal to promote.

7. The recommendation computer according to claim 6, in a recommendation system combination comprising:
  a product information database;
  a product similarity database;
  a customer purchase history database; and
  a customer order database.

8. The recommendation computer according to claim 1, wherein by executing the program code, the recommendation computer is configured to:
  communicate with a customer preferences database; and
  calculate using the trained model, for each at least one similar product and for each at least one product favoured by the customer as stored in the customer preferences database, a probability that the customer forgot to add the at least one similar product or the at least one favoured product to the customer order having at least one product to be purchased by the customer.

9. The recommendation computer according to claim 1, wherein by executing the program code, the recommendation computer is configured to:
  select at least one product from among one or more at least one similar product based on the calculated probability for the at least one similar product.

10. The recommendation computer according to claim 9, wherein by executing the program code, the recommendation computer is configured to sort the at least one or more similar products by the calculated probability for the at least one or more similar products.

11. The recommendation computer according to claim 9, wherein by executing the program code, the recommendation computer is configured to filter the at least one or more similar products based on at least one or more of:
  products to be purchased by the customer;
  products unavailable for order in a customer's chosen delivery slot; or
  products illegal to promote.

12. A recommendation computer according to claim 1, in a recommendation system combination comprising:
  the product information database;
  the product similarity database;
  the customer purchase history database; and
  the customer order database.

13. The recommendation computer according to claim 12, wherein the recommendation system comprises a customer preferences database, wherein the recommendation computer is configured to communicate with the customer preferences database, wherein the recommendation computer includes program code that, when executed, causes the recommendation computer to calculate using the trained model, for each at least one similar product and for each at least one product favoured by the customer as stored in the customer preferences database, a probability that the customer forgot to add the at least one similar product to the current products in the customer's virtual basket or the at least one favoured product to the current products in the customer's virtual basket having at least one product to be purchased by the customer.

14. The recommendation computer according to claim 1, in a recommendation system combination, the recommendation system having a customer preferences database,
  wherein the program code, when executed, causes the recommendation computer to:
    communicate with the customer preferences database of the recommendation unit, and
    calculate using the trained model, for each at least one similar product absent from the customer's virtual basket and for each at least one product absent from the customer's virtual basket and favoured by the customer as stored in the customer preferences database, a probability that the at least one similar product should be included in the current products in the customer's virtual basket or the at least one favoured product to the current products in the customer's virtual basket having at least one product to be purchased by the customer.

15. A method for providing recommendations in a computer system, the method comprising:
  executing, by the computer system, program code which causes the computer system to operations including:
    determining at least one similarity between information about a product stored in a product information database and information about at least one other product stored in the product information database;
    storing the at least one determined similarity in a product similarity database;
    training a model for calculating a probability that a product should be included in a customer's current order, based on information about products previously purchased by at least the customer as stored in a customer purchase history database and information about at least one determined similarity as stored in the product similarity database including at least one of: if the customer has searched for similar product and if the customer has already browsed for a particular/similar product but has not added it to the current order;
    generating information regarding at least one product that is absent from the customer's virtual basket and similar to at least one product to be purchased by the customer based on information about the current order of the customer stored in a customer order database and information about determined similarities as stored in the product similarity database;
    providing, as an input to the trained model, the at least one product determined to be similar to at least one product included in the customer's current order and that is not currently stored in the customer's virtual basket;
    calculating, using the trained model, for each at least one similar product, a probability that the at least one similar product should be included in the current order, the probability being calculated as a function of at least preferred products identified by the customer and a purchase history of the customer;

recommending, to computing device of the customer, products which should be included in the order based on the probability; and retraining the model based on the recommended products selected for purchase by the customer.

16. The method according to claim 15, wherein the program code, when executed, causes the computer system to train the model based on at least one or more of:

how many days ago the customer bought a particular product;

how many orders the customer previously placed containing a particular product;

what percentage of the customer's past orders contained a particular product;

for a predetermined number of past orders, whether those past ordered included a particular product;

if a product to be purchased by the customer stored in the customer order database includes a similar product;

if products to be purchased by the customer as stored in the customer order database is has been previously purchased together with another product, based on past customer shopping behaviour and patterns based across other customers;

if the customer marked a particular product as not being a favourite product;

how many orders the customer has had delivered before;

an average number of products per customer order;

number of days since the customer's first order;

number of days since the customer's previous order;

average number of days between the customer's orders;

median number of days between the customer's orders;

number of distinct products purchased previously by the customer;

percentage of all orders in a preceding predetermined number of days contained a particular product;

product description and images;

list of substitutes for a particular product;

list of products to be purchased by the customer; or date and time of delivery.

17. The method according to claim 15, wherein executing the program code causes the computer system to perform operations including:

calculating, using the trained model, for each at least one or more similar products and for each at least one or more products favoured by the customer as stored in a customer preferences database, a probability that the at least one similar product should be included in the current products in the customer's virtual basket or the at least one favoured product to the current products in the customer's virtual basket having the at least one product to be purchased by the customer.

18. The method according to claim 15, wherein executing the program code causes the computer system to perform operations including:

selecting at least one product from the at least one or more similar products absent from the customer's virtual basket based on the calculated probability for the at least one similar product.

19. The method according to claim 18, wherein executing the program code causes the computer system to perform the selecting operation by:

filtering the at least one or more similar products based on at least one or more of:

products to be purchased by the customer;

products unavailable for order in the customer's chosen delivery slot; or products illegal to promote.

20. The method according to claim 15, wherein executing the program code causes the computer system to perform the selecting operation by:

sorting the at least one or more similar products by the calculated probability for each at least one similar product.

* * * * *